(12) United States Patent
Dick

(10) Patent No.: US 8,649,307 B1
(45) Date of Patent: Feb. 11, 2014

(54) MOBILE COMMUNICATION WITH MODES FOR SINGLE CARRIER AND SPATIAL AND FREQUENCY MULTIPLEXING

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 246 days.

(21) Appl. No.: 13/196,056

(22) Filed: Aug. 2, 2011

(51) Int. Cl.
*H04W 52/02* (2009.01)
*G08C 17/00* (2006.01)
*H04B 7/204* (2006.01)

(52) U.S. Cl.
USPC .......................................... 370/311; 370/319

(58) Field of Classification Search
USPC .................. 370/203–209, 310–338
See application file for complete search history.

(56) References Cited

U.S. PATENT DOCUMENTS

| | | | |
|---|---|---|---|
| 2009/0046569 A1* | 2/2009 | Chen et al. ..................... | 370/203 |
| 2009/0154600 A1* | 6/2009 | Kim et al. ..................... | 375/320 |
| 2010/0091919 A1* | 4/2010 | Xu et al. ......................... | 375/346 |

FOREIGN PATENT DOCUMENTS

| | | | | |
|---|---|---|---|---|
| EP | 2 259 654 A1 | 12/2010 | | |
| EP | 2259654 A1 * | 12/2010 | .............. | H04J 11/00 |
| WO | WO 2008/057969 A2 | 5/2008 | | |
| WO | WO 2011/039970 A1 | 4/2011 | | |

OTHER PUBLICATIONS

EP 2259654 A1 is provided in IDS by the applicant.*
Myung, Hyung G., "Single Carrier FDMA for Uplink Wireless Transmission," *IEEE Vehicular Technology Magazine*, Sep. 2006, pp. 30-38, IEEE, Piscataway, New Jersey, USA.
Wilan, *High Speed Wireless OFDM Communication Systems*, Feb. 2001, v1.0, pp. 1-8, WiLAN, Ottawa, Ontario, Canada.

* cited by examiner

*Primary Examiner* — Un C Cho
*Assistant Examiner* — M Mostazir Rahman
(74) *Attorney, Agent, or Firm* — LeRoy D. Maunu

(57) ABSTRACT

A system for mobile communication includes a mobile communication device that has a first plurality of antennas and a transmitter. The transmitter, in response to a requested bandwidth for a first packet not being greater than a bandwidth of a first transmit mode, is configured to encode and transmit the first packet from the first plurality of antennas. The first packet has a single-carrier frequency-division-multiple-access (SC-FDMA) modulation of the first transmit mode. In response to a requested bandwidth for a second packet being greater than the bandwidth of the first transmit mode, the transmitter is configured to encode and transmit the second packet from the first antennas. The second packet has a multiple-in-multiple-out orthogonal-frequency-division-multiplexing (MIMO-OFDM) modulation of a second transmit mode. A base station includes a second plurality of antennas and is configured to receive and decode the first packet and the second packet.

19 Claims, 2 Drawing Sheets

MOBILE COMMUNICATION WITH MODES FOR SINGLE CARRIER AND SPATIAL AND FREQUENCY MULTIPLEXING

FIELD OF THE INVENTION

The present invention generally relates to mobile communication systems, and more particularly to mobile communication systems using spatial and frequency multiplexing.

BACKGROUND

Mobile communication systems permit communication of voice and other messages between mobile devices. There is a general need to increase the available communication bandwidth of mobile devices and to reduce the capital investment and operating expenses for mobile communication systems. There is a general need to reduce the power demands of mobile devices to conserve battery power.

The present invention may address one or more of the above issues.

SUMMARY

In one embodiment, a system is provided for mobile communication. The system includes a mobile communication device including a first plurality of antennas and a transmitter that is coupled to transmit from the first plurality of antennas. In response to a requested bandwidth for a first packet not being greater than a bandwidth of a first transmit mode, the transmitter is configured to encode and transmit the first packet from the first plurality of antennas. The first packet has a single-carrier frequency-division-multiple-access (SC-FDMA) modulation of the first transmit mode. In response to a requested bandwidth for a second packet being greater than the bandwidth of the first transmit mode, the transmitter is configured to encode and transmit the second packet from the first plurality of antennas. The second packet has a multiple-in-multiple-out orthogonal-frequency-division-multiplexing (MIMO-OFDM) modulation of a second transmit mode. A base station includes a second plurality of antennas electromagnetically coupled to the first antennas of the mobile communication device. The base station is configured to receive and decode the first packet having the SC-FDMA modulation and the second packet having the MIMO-OFDM modulation.

In another embodiment, a mobile communication device includes a plurality of antennas and a transceiver coupled to the antennas. The transceiver includes a transmitter and a receiver and is operable in a receive mode and in first and second transmit modes. In the receive mode, the transmitter is configured to not transmit and the receiver is configured to receive and decode a first packet having a multiple-in-multiple-out orthogonal-frequency-division-multiplexing (MIMO-OFDM) modulation of the receive mode. In response to a requested bandwidth for a second packet not being greater than a bandwidth of the first transmit mode, the transmitter is configured to encode and transmit the second packet from the antennas. The second packet has a single-carrier frequency-division-multiple-access (SC-FDMA) modulation of the first transmit mode. In response to a requested bandwidth for a third packet being greater than the bandwidth of the first transmit mode, the transmitter is configured to encode and transmit the third packet from the antennas. The third packet has the MIMO-OFDM modulation of the second transmit mode.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
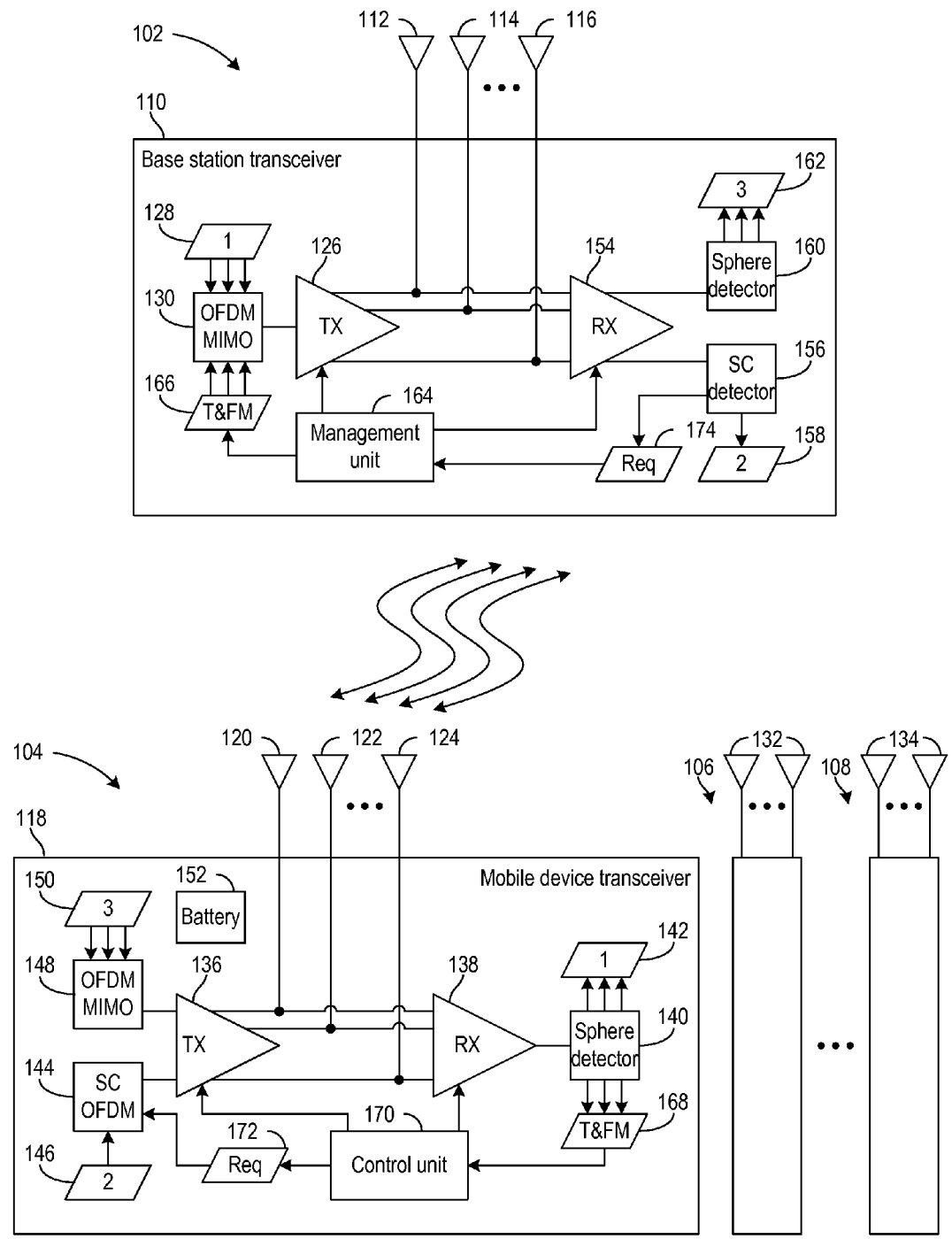
FIG. 1 is a block diagram of a system for mobile communication.

FIG. 1 is a block diagram of a system for mobile communication. The system includes a base station 102 and mobile communication devices 104 and 106 through 108 that communicate electromagnetically. The system has several operating modes to provide the requested bandwidth for packets from each mobile communication device to the base station 102, while conserving power consumption in the mobile communication devices 104 and 106 through 108 and simplifying the base station 102.

The base station 102 includes a transceiver 110 and antennas 112 and 114 through 116 that transfer data symbols to and from the mobile communication devices 104 and 106 through 108. Similarly, the mobile communication device 104 includes a transceiver 118 and antennas 120 and 122 through 124 that transfer data symbols to and from the base station 102.

An electromagnetic spectrum can be partitioned into a set of orthogonal frequencies. In one embodiment, the frequencies are orthogonal because the separation between the frequencies equals or exceeds the bandwidth from modulating the frequencies with the data symbols. This limits the interference between the concurrently modulated orthogonal frequencies.

In one embodiment, a subset of the orthogonal frequencies is allocated to a communication link, such as from the base station 102 to mobile communication device 104. Because the number of data symbols that can be concurrently transmitted equals the number of allocated orthogonal frequencies, the bandwidth for a particular communication link can be increased by increasing the allocated orthogonal frequencies in the subset.

In addition, different subsets of the orthogonal frequencies can be allocated to various communication links, such as allocating one subset of the orthogonal frequencies to communication from the base station 102 to mobile communication device 104 and another subset of the orthogonal frequencies to communication from base station 102 to mobile communication device 106. Then, transceiver 110 of base station 102 simultaneously transmits multiple data symbols to mobile communication device 104 and multiple data symbols to mobile communication device 106. This is orthogonal frequency division multiplexing (OFDM) in one embodiment.

In one embodiment, the OFDM further includes time division multiplexing. In a simple example of time division multiplexing, a subset of the orthogonal frequencies is allocated to a communication link between base station 102 and mobile communication device 108, and this subset is time division multiplexed into time periods reserved for communication from base station 102 to mobile communication device 108, and time periods reserved for communication in the opposite direction from mobile communication device 108 to base station 102.

OFDM is further extended in one embodiment to multiple-in-multiple-out OFDM (MIMO-OFDM). For MIMO, communicated data symbols are spatially multiplexed between multiple transmitting antennas and multiple receiving antennas. In an example of an embodiment of MIMO-OFDM, a subset of the orthogonal frequencies is allocated to communication from base station 102 to mobile communication device 104 during a particular time period, and on each of the allocated orthogonal frequencies transceiver 110 concurrently transmits an independent data symbol from each of antennas 112 and 114 through 116. Each of antennas 120 and 122 through 124 of mobile communication device 104 receives a mixture of the data symbols transmitted on each orthogonal frequency, but mobile communication device 104 can recover the transmitted data symbols from the received mixtures.

Generally, the number of data symbols that can be spatially multiplexed between N transmitting antennas and M receiving antennas is the lesser of N and M. Thus, MIMO systems frequently have an equal number of antennas, such as four antennas, on the various devices. However, having N and M not equal increases the robustness of the MIMO communication, because destructive multi-path interference is less likely to occur at the receiving antennas for all pairings of each transmitting antenna that is transmitting a particular data symbol and each receiving antenna.

While OFDM has many advantages, one disadvantage of OFDM is that the peak transmit power is significantly higher than the average transmit power. Thus, OFDM has a high peak-to-average power ratio (PAPR). To prevent distortion of transmitted OFDM, the transmitting RF power amplifier should have high linearity throughout the range of transmitted power. For a specified average transmit power, OFDM requires an RF power amplifier with high linearity over a wider range of transmit power than another modulation scheme with a lower PAPR. This causes the RF power amplifier for OFDM to consume more power from its power supply than an RF power amplifier providing the same average transmit power using another modulation scheme with a lower PAPR.

Single-carrier frequency division multiple access (SC-FDMA) has a lower PAPR than OFDM. In one embodiment, SC-FDMA uses the same orthogonal frequencies as OFDM, but with a different modulation scheme. Instead of transmitting the data symbols in each data block on respective orthogonal frequencies during the symbol period as in OFDM, SC-FDMA performs an N-point discrete Fourier transform (DFT) on each data block of N symbols, maps the resulting frequency domain representation to each data block's allocated N of the available M orthogonal frequencies, and transmits the waveform resulting from an M-point inverse DFT over all of the M orthogonal frequencies. In one embodiment for localized SC-FDMA, the N mapped orthogonal frequencies for each data block are an adjacent subset of the available M orthogonal frequencies. In another embodiment for distributed SC-FDMA, the N mapped orthogonal frequencies are evenly distributed through the range of the available M orthogonal frequencies. An SC-FDMA receiver reverses the process to recover the N symbols in each data block.

SC-FDMA MIMO is SC-FDMA plus spatial multiplexing between multiple transmitting antennas and multiple receiving antennas. However, SC-FDMA MIMO generally uses a complex maximum likelihood detector to achieve a high performance at the receiver. The maximum likelihood detector is complex, because it exhaustively searches the many possible combinations of data symbols. In contrast, MIMO-OFDM supports the dramatically simpler sphere detector that achieves nearly the detection performance of a maximum likelihood detector.

One or more embodiments have two modes for uplink communication from mobile communication devices 104 and 106 through 108 to base station 102. The uplink communication in one mode uses SC-FDMA without MIMO, to conserve battery power in the mobile communication devices 104 and 106 through 108. The uplink communication in another mode uses MIMO-OFDM, for increased communication bandwidth without dramatically increasing the complexity and cost of the base station 102. The downlink communication from the base station 102 to the mobile communication devices 104 and 106 through 108 is MIMO-OFDM, because the base station 102 does not generally require conservation of battery power.

The base station transceiver 110 includes a transmitter 126 configured to transmit a packet 128 of data symbols from antennas 112 and 114 through 116. MIMO-OFDM encoder 130 encodes packet 128 of data symbols onto an allocated subset of the available orthogonal frequencies, with a data symbol for each allocated frequency and each of the antennas 112 and 114 through 116 during each symbol period. During each symbol period, transmitter 126 transmits a data symbol from each of the antennas 112 and 114 through 116 on each allocated orthogonal frequency. A communication medium, such as free space, electromagnetically couples antennas 112 and 114 through 116 to the antennas 120 and 122 through 124 of mobile communication device 104 and the antennas 132 and 134 of mobile communication devices 106 through 108. Thus, transmitter 126 transmits the encoded packet 128 of data symbols that are spatially multiplexed via antennas 112 and 114 through 116 and frequency multiplexed over an allocated subset of the orthogonal frequencies.

Transceiver 118 of mobile communication device 104 is configurable to operate in a receive mode and in first and second transmit modes.

While operating in the receive mode, the transmitter 136 of transceiver 118 does not transmit, and the receiver 138 of transceiver 118 receives from the antennas 120 and 122 through 124 the encoded packet 128 of data symbols. The data symbols are spatially multiplexed via antennas 120 and 122 through 124 and frequency multiplexed over the allocated subset of orthogonal frequencies. Sphere detector 140 successfully recovers a received packet 142 of data symbols when packet 142 matches packet 128.

While operating in the first transmit mode, SC-FDMA encoder 144 encodes packet 146 of data symbols on a single carrier frequency multiplexed over a second subset of the orthogonal frequencies, and transmitter 136 transmits the encoded packet 146 from antennas 120 and 122 through 124 on the single carrier.

While operating in the second transmit mode, MIMO-OFDM encoder 148 encodes packet 150 of data symbols onto an allocated subset of the available orthogonal frequencies, with a data symbol for each allocated frequency on each of the antennas 120 and 122 through 124. Transmitter 136 transmits from the antennas 120 and 122 through 124 the third packet 150 of data symbols that are spatially multiplexed via antennas 120 and 122 through 124 and frequency multiplexed over the allocated subset of the orthogonal frequencies.

The allocated subset of orthogonal frequencies for the first and second transmit modes are the same orthogonal frequencies in one embodiment, and different orthogonal frequencies in another embodiment. The allocated subset of orthogonal frequencies for the receive mode are the same orthogonal frequencies as a transmit mode in one embodiment, and different orthogonal frequencies in another embodiment.

Because the SC-FDMA modulation of the first transmit mode has a better PAPR than the MIMO-OFDM modulation of the second transmit mode, in first transmit mode transmitter 136 consumes less power from battery 152 than transmitter 136 consumes in the second transmit mode. Because the MIMO of MIMO-OFDM modulation of the second transmit mode provides higher bandwidth than the SC-FDMA modulation of the first transmit mode, in the second transmit mode the MIMO provides higher bandwidth than in the first transmit mode. Thus, in one embodiment, an uplink communication from mobile communication device 104 to base station 102 defaults to using the first transmit mode, and the uplink communication uses the second transmit mode when higher bandwidth is requested.

The transceiver 110 of base station 102 includes a receiver 154 that is configured to receive the encoded second and third packets 146 and 150 from antennas 112 and 114 through 116. In one embodiment, the expected modulation scheme is scheduled. For scheduled SC-FDMA modulation on the single carrier frequency multiplexed over a subset of the orthogonal frequencies, SC-FDMA detector 156 of base station transceiver 110 successfully decodes received packet 158 of data symbols when packet 158 matches packet 146. For scheduled MIMO-OFDM modulation that is spatially multiplexed between the first and second antennas and frequency multiplexed over a subset of the orthogonal frequencies, sphere detector 160 successfully decodes received packet 162 of data symbols when packet 162 matches packet 150. Because sphere detector 160 efficiently recovers packet 162, sphere detector 160 does not add much cost to base station 102.

In one embodiment, the base station transceiver 110 includes a management unit 164 configured to allocate subsets of the orthogonal frequencies for the receive mode and the first and second transmit modes of each of the mobile communication devices 104 and 106 through 108. The management unit 164 also schedules time intervals for the receive mode and the first and second transmit modes. To disseminate this allocation and schedule, management unit 164 directs the base station 102 to transmit a management packet 166 that specifies the allocation and schedule. The transceiver 118 of the mobile communication device 104 receives and decodes a corresponding management packet 168 using the receive mode, and forwards the allocation and the schedule from the management packet 168 to the control unit 170 of the mobile communication device 104. Control unit 170 is configured to direct the transceiver 118 to receive in the receive mode and transmit in the first and second transmit modes according to the allocation and schedule.

The control unit 170 of the mobile communication device 104 generates a request packet 172 when the requested bandwidth for a data packet is greater than an available bandwidth of the single carrier frequency multiplexed over the orthogonal frequencies allocated to the first transmit mode. Optionally, a nearly discharged battery 152 prevents generating such a request packet 172. A nearly discharged battery may be detected with a charge level threshold. In response to the detected charge of the battery falling below the charge level threshold, the battery is determined to be nearly discharged. In response to the detected charge of the battery being above the charge level threshold, the battery is considered to be sufficiently charged. The control unit 170 directs the transceiver 118 to transmit the request packet 172 to the base station, and the request packet 172 is transmitted using the first transmit mode. Upon receiving the corresponding request packet 174, the management unit 164 directs the base station 102 to transmit a management packet 166 with the schedule and allocation for transmitting the data packet using second transmit mode. The control unit 170 receives corresponding management packet 168, and directs transceiver 118 to transmit the data packet using the second transmit mode according to the allocation and schedule.

In contrast, when the requested bandwidth of a data packet is not greater than the available bandwidth of the single carrier, the control unit 170 directs the transceiver 118 to transmit the data packet using the first transmit mode. Regardless of the requested bandwidth, the data packet is optionally transmitted using the first transmit mode when battery 152 is nearly discharged. Frequently, transceiver 118 transmits the data packet according to an existing allocation and schedule for the first transmit mode. It will be appreciated that the uplink communication bandwidth can be increased up to a limit by adding more orthogonal frequencies and/or more time intervals to the single carrier of the first transmit mode, and the communication bandwidth can be increased beyond this limit by allocating orthogonal frequencies and scheduling time intervals for the second transmit mode.

In one embodiment, transmitter 136 of the mobile communication device 104 transmits the data symbols of the packet 146 from exactly one antenna 120 on the single carrier frequency multiplexed over the allocated subset of orthogonal frequencies. In another embodiment, transmitter 136 transmits the data symbols of the packet 146 from all the antennas 120 and 122 through 124.

Figure 2:
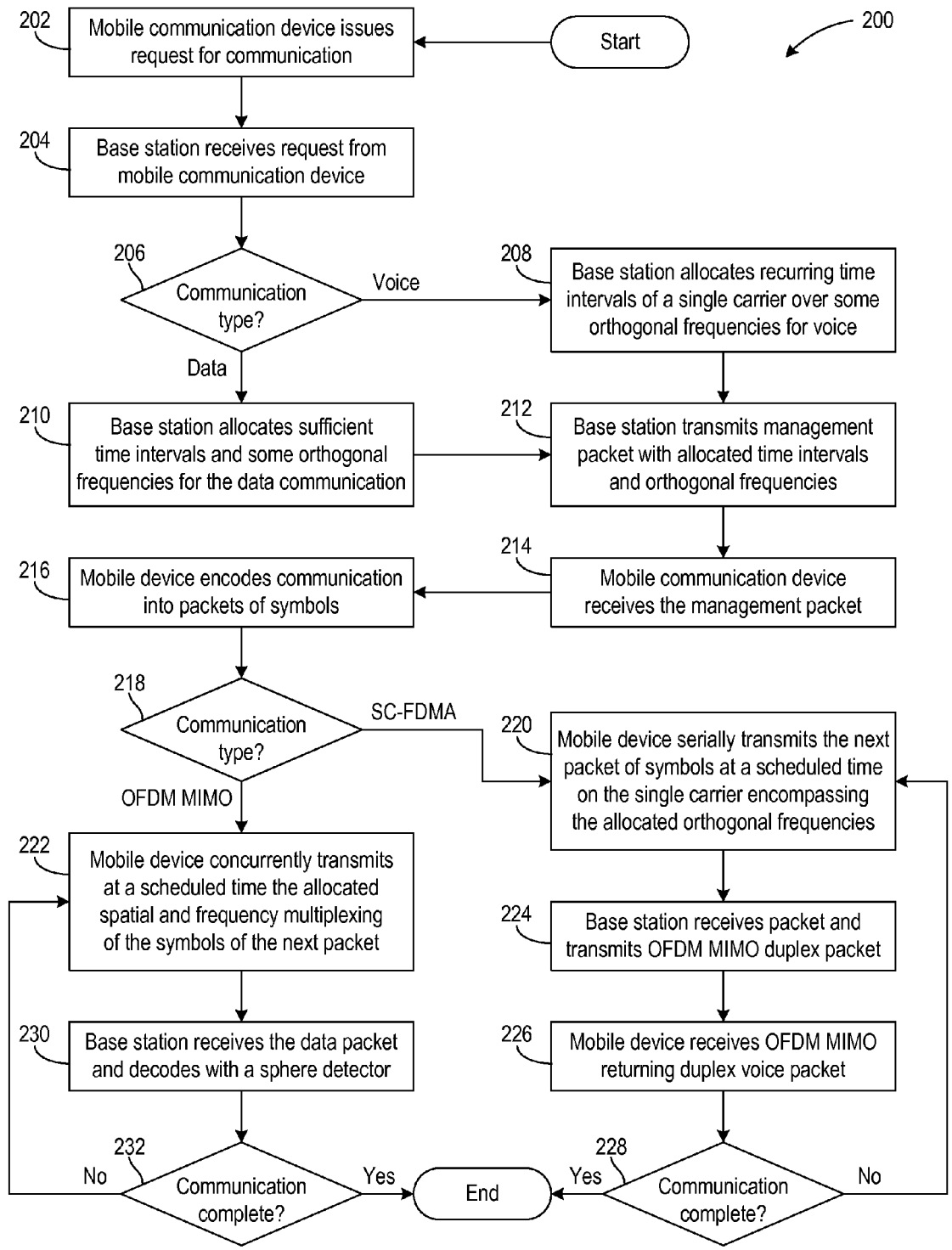
FIG. 2 is a flow diagram of a process for transferring voice and data communications between a mobile device and a base station.

FIG. 2 is a flow diagram of a process 200 for transferring voice and data communications between a mobile device and a base station. Communication bandwidth is allocated according to the communication type.

At step 202, a mobile communication device issues a request for communication. The request can include opening a persistent channel for a voice conversation or requesting a one-time transfer of a data file, such as an image file, having a specified size. In one embodiment, the request also includes a charge status of a battery of the mobile communication device. The base station receives the request at step 204.

A management unit of the base station checks the requested communication type at decision 206. For a voice communication, process 200 proceeds to step 208; otherwise for a data communication process 200 proceeds to step 210. At step 208, the base station allocates recurring time intervals of a single carrier frequency multiplexed over an allocated subset of the orthogonal frequencies using SC-FDMA. At step 210, the base station allocates a number of time intervals sufficient for transmitting the data communication on an allocated subset of the orthogonal frequencies using MIMO-OFDM. In one embodiment, when the battery of the mobile communication device is nearly discharged, the base station instead allocates time intervals and orthogonal frequencies sufficient for transmitting the data communication using SC-FDMA.

For both voice and data communications, the base station transmits a management packet including the modulation type and the allocations of time intervals and orthogonal frequencies at step 212. At step 214, the mobile communication device receives the management packet.

At step 216, the mobile communication device encodes the voice or data communication into one or more packets of symbols.

Decision 218 checks the communication type. Process 200 proceeds to step 220 for SC-FDMA, and process 200 proceeds to step 222 for MIMO-OFDM.

At step 220, the mobile communication device transmits the next packet of data symbols at a scheduled time on the single carrier frequency multiplexed over the allocated orthogonal frequencies. The base station receives the SC-FDMA packet and optionally transmits a duplex packet for the other side of a voice conversation using MIMO-OFDM at step 224, and the mobile communication device receives this duplex packet at step 226. Decision 228 checks whether the communication is complete. When the communication is not complete, process 200 returns to step 220 for the next packet.

At step 222, the mobile communication device transmits the data symbols on the allocated orthogonal frequencies at a scheduled time. The packet of data symbols is also spatially multiplexed using MIMO-OFDM. At step 230, the base station receives the data packet and decodes the data packet using a sphere detector. Decision 232 checks whether the data communication is complete. When the data communication is not complete, process 200 returns to step 222 for the next data packet.

The embodiments of the present invention are thought to be applicable to a variety of communication systems. Other aspects and embodiments of the present invention will be apparent to those skilled in the art from consideration of the specification and practice of the invention disclosed herein. It is intended that the specification and illustrated embodiments be considered as examples only, with the true scope of the invention being indicated by the following claims.

What is claimed is:

1. A system for mobile communication, comprising:
a mobile communication device including a first plurality of antennas and a transmitter that is coupled to transmit from the first plurality of antennas;
wherein the mobile communication device includes a battery coupled to the transmitter;
wherein the transmitter is configured to:
generate a request packet that includes a charge status of the battery;
transmit the request packet to a base station;
in response to a requested bandwidth for a first packet not being greater than a bandwidth of a first transmit mode, encode and transmit the first packet from the first plurality of antennas;
wherein the first packet has a single-carrier frequency-division-multiple-access (SC-FDMA) modulation of the first transmit mode;
in response to a requested bandwidth for a second packet being greater than the bandwidth of the first transmit mode, encode and transmit the second packet from the first plurality of antennas; and
wherein the second packet has a multiple-in-multiple-out orthogonal-frequency-division-multiplexing (MIMO-OFDM) modulation of a second transmit mode;
the base station including a second plurality of antennas electromagnetically coupled to the first antennas of the mobile communication device;
wherein the base station is configured to receive and decode the first packet having the SC-FDMA modulation and the second packet having the MIMO-OFDM modulation;
wherein the base station includes a management unit configured to generate an allocation of a first, a second, and a third subset of a plurality of orthogonal frequencies and further configured to generate a schedule of a plurality of time intervals for a receive mode and the first and second transmit modes;
wherein in response to the charge status of the battery specified in the request packet indicating the charge of the battery is less than or equal to a charge level threshold, the management unit generates the schedule to include time intervals and orthogonal frequencies for transmitting using SC-FDMA modulation; and
wherein the mobile communication device further includes a control unit coupled to a receiver, the control unit being configured to direct the receiver to receive in the receive mode and the transmitter to transmit in the first and second transmit modes according to the allocation and the schedule.

2. The system of claim 1, wherein:
the base station includes a first detector and a second detector coupled to the second antennas:
the first detector is configured to decode the SC-FDMA modulation of the first packet received at the second antennas; and
the second detector is a sphere detector configured to decode the MIMO-OFDM modulation of the second packet received at the second antennas.

3. The system of claim 1, wherein:
the MIMO-OFDM modulation of the receive mode is spatially multiplexed between the first and second pluralities of antennas and is frequency multiplexed over the first subset of the orthogonal frequencies;
the SC-FDMA modulation of the first transmit mode is frequency multiplexed over the second subset of the orthogonal frequencies; and
the MIMO-OFDM modulation of the second transmit mode is spatially multiplexed between the first and second pluralities of antennas and is frequency multiplexed over the third subset of the orthogonal frequencies.

4. The system of claim 1, wherein:
the management unit is configured to direct the base station to transmit a management packet to the mobile communication device;
the management packet specifies the allocation and the schedule specified; and
the receiver is configured to receive the management packet from the base station in the MIMO-OFDM modulation of the receive mode, and to forward the allocation and the schedule from the management packet to the control unit of the mobile communication device.

5. The system of claim 4, wherein:
the control unit is further configured, in response to a requested bandwidth of a packet being greater than the bandwidth of the first transmit mode, to direct the transmitter of the mobile communication device to transmit a request packet to the base station in the SC-FDMA modulation of the first transmit mode;
the management unit is further configured to direct the base station to transmit the management packet in response to the request packet; and
the control unit, in response to the management packet, is configured to direct the transmitter to encode and transmit the packet in the MIMO-OFDM modulation of the second transmit mode.

6. The system of claim 5, wherein:
the base station further includes a sphere detector;
the sphere detector is configured to decode the MIMO-OFDM modulation of the packet; and the MIMO-OFDM modulation is spatially multiplexed between the first and second pluralities of antennas and is frequency multiplexed over the third subset of the orthogonal frequencies.

7. The system of claim 4, wherein, in response to a requested bandwidth of a packet being not greater than the bandwidth of the first transmit mode, the control unit of the mobile communication device is configured to direct the transmitter of the mobile communication device to encode and transmit the packet in the SC-FDMA modulation of the first transmit mode.

8. The system of claim 1, wherein, in response to operating in the first transmit mode, the transmitter is configured to transmit from exactly one of the first antennas the first packet encoded in the SC-FDMA modulation.

9. The system of claim 1, wherein:
the transmitter is configured to transmit each of a plurality of voice packets in the SC-FDMA modulation of the first transmit mode; and
the transmitter is further configured to transmit each of a plurality of image packets in the MIMO-OFDM modulation of the second transmit mode.

10. The system of claim 1, wherein:
the transmitter is further configured to:
transmit a packet in the first transmit mode in response to a requested bandwidth of the packet being not greater than the bandwidth of the first transmit mode;
transmit the packet in the first transmit mode in response to a charge level of the battery being less than or equal to the charge level threshold and the requested bandwidth being greater than the bandwidth of the first transmit mode; and
transmit the packet in the second transmit mode in response to the charge level of the battery being greater than the battery charge level threshold and the requested bandwidth being greater than the bandwidth of the first transmit mode.

11. The system of claim 1, wherein:
the mobile communication device is one of a plurality of mobile communication devices of the system;
each mobile communication device of the plurality includes a respective plurality of antennas and a transmitter and a receiver that are coupled to the respective antennas;
each mobile communication device of the plurality includes a respective battery coupled to the transmitter; and
each mobile communication device has a receive mode and the first and second transmit modes, wherein:
the transmitter is configured to generate a respective request packet that includes a charge status of the battery and transmit the request packet to the base station;
in the receive mode the transmitter is configured to not transmit and the receiver is configured to receive the MIMO-OFDM modulation from the respective antennas, and the MIMO-OFDM modulation is spatially multiplexed via the respective antennas and is frequency multiplexed over a respective first subset of a plurality of orthogonal frequencies;
in the first transmit mode the transmitter is configured to transmit the SC-FDMA modulation from the respective antennas, and the SC-FDMA modulation is frequency multiplexed over a respective second subset of the orthogonal frequencies; and
in the second transmit mode the transmitter is configured to transmit the MIMO-OFDM modulation from the respective antennas, and the MIMO-OFDM modulation is spatially multiplexed via the respective antennas and is frequency multiplexed over a respective third subset of the orthogonal frequencies.

12. The system of claim 11, wherein:
the management unit is further configured to generate an allocation of the respective first, respective second, and respective third subsets for each mobile communication device, and to generate a schedule of a plurality of time intervals for the receive mode and the first and second transmit modes for each mobile communication device; and
each mobile communication device further includes a control unit configured to direct the receiver of the mobile communication device to receive in the receive mode and the transmitter of the mobile communication device to transmit in the first and second transmit modes according to the allocation and the schedule.

13. The system of claim 12, wherein:
in response to a requested bandwidth of a pending outgoing packet being greater than an available bandwidth of the first transmit mode for one of the mobile communication devices, the control unit of the mobile communication device is configured to direct the transmitter of the mobile communication device to transmit a request packet to the base station in the SC-FDMA modulation of the first transmit mode;
the management unit is configured to direct the base station to transmit a management packet in response to the request packet; and
in response to the management packet, the control unit is configured to direct the transmitter to transmit the pending outgoing packet in the MIMO-OFDM modulation of the second transmit mode.

14. The system of claim 13, wherein the base station further includes a sphere detector configured to decode the MIMO-OFDM modulation of the pending outgoing packet.

15. A mobile communication device, comprising:
a plurality of antennas;
a battery;
a transceiver coupled to the antennas and to the battery and including a transmitter and a receiver, the transceiver configured to be operable in a receive mode and in first and second transmit modes; and
wherein:
the transmitter is configured to generate a request packet that includes a charge status of the battery and transmit the request packet to a base station;
in the receive mode the transmitter is configured to not transmit and the receiver is configured to receive and decode a first packet having a multiple-in-multiple-out orthogonal-frequency-division-multiplexing (MIMO-OFDM) modulation of the receive mode;
in response to a requested bandwidth for a second packet not being greater than a bandwidth of the first transmit mode, the transmitter is configured to encode and transmit the second packet from the antennas, the second packet having a single-carrier frequency-division-multiple-access (SC-FDMA) modulation of the first transmit mode; and
in response to a requested bandwidth for a third packet being greater than the bandwidth of the first transmit mode, the transmitter is configured to encode and transmit the third packet from the antennas, the third packet having the MIMO-OFDM modulation of the second transmit mode;

in response to the request packet, the transceiver is configured to receive a management packet from the base station, the management packet including, in response to the charge status of the battery specified in the request packet indicating the charge of the battery is less than or equal to a charge level threshold, a schedule of time intervals and orthogonal frequencies for transmitting using SC-FDMA modulation.

16. The device of claim 15, wherein the transceiver is always in one of the receive mode or the first or second transmit modes during communicative operation of the transceiver.

17. The device of claim 15, wherein the transceiver is configured to time division multiplex operation between the receive mode, the first transmit mode, and the second transmit mode.

18. The device of claim 15, further comprising a control unit coupled to the transceiver, wherein:
in response to a requested bandwidth of a pending outgoing packet being greater than the bandwidth of the first transmit mode, the control unit is configured to direct the transmitter to transmit the request packet to the base station in the SC-FDMA modulation of the first transmit mode;
in response to the request packet, the transceiver is configured to receive a management packet from the base station in the MIMO-OFDM modulation of the receive mode, a subset of a plurality of orthogonal frequencies specified in the management packet; and
in response to the management packet, the control unit is configured to direct the transmitter to encode and transmit the pending outgoing packet in the MIMO-OFDM modulation of the second transmit mode, and the MIMO-OFDM modulation of the pending outgoing packet is spatially multiplexed via the antennas and is frequency multiplexed over the subset of the orthogonal frequencies.

19. The device of claim 15, wherein:
the transmitter is further configured to:
transmit a pending outgoing packet in the first transmit mode in response to a requested bandwidth of the pending outgoing packet being not greater than the bandwidth of the first transmit mode;
transmit the pending outgoing packet in the first transmit mode in response to a charge level of the battery being less than or equal to a charge level threshold and the requested bandwidth being greater than the bandwidth of the first transmit mode; and
transmit the pending outgoing packet in the second transmit mode in response to the charge level of the battery being greater than the charge level threshold and the requested bandwidth being greater than the bandwidth of the first transmit mode.

* * * * *